Patented Feb. 9, 1937

2,070,036

UNITED STATES PATENT OFFICE 2,070,036

WALL PLASTER COMPOSITION

George Witty, Long Island City, N. Y., assignor of one-fourth to Siegfried N. Eben, one-fourth to Raymond J. Scanlan, and one-fourth to James M. Mundy, New York, N. Y.

No Drawing. Application April 28, 1936, Serial No. 76,739

2 Claims. (Cl. 106—24)

The object of the invention is to provide an improved wall plaster composition which will be hard, free from expansion and contraction, fireproof, soundproof, waterproof and non-conductor of heat, sound and electricity; and provide further a plaster which may be made up into any desirable shape, and which may be worked smooth or rough surfaced.

Another object of the invention is to provide an improved wall plaster composition and the process of making the same, its object being to produce such a composition which although consisting chiefly of alkali waste material, will have a workability much superior thereto. It will be understood that the term "workability" has reference chiefly to the factors of plasticity, flexibility, adhesiveness to the surface to which it is applied, good covering capacity, and ease of spreading.

A further object of the invention is to provide a wall plaster composition which will be cheap to manufacture and adapted for shipment in dry powder form to be mixed with water for use.

My invention consists of a mixture of alkali waste material, granulated blast furnace slag, calcined dolomite, calcium sulphate, feldspar, vegetable fibre, potassium sulphate and aluminum sulphate. The proportions which I prefer to employ are—100 parts of alkali waste material, 50 parts blast furnace slag, 25 parts calcined dolomite, 10 parts calcium sulphate, 7 parts feldspar, 3 parts vegetable fibre, 3 parts potassium sulphate and 2 parts aluminum sulphate thoroughly mixed in dry state. The whole mixture is then ground to a palpable powder and is then ready to be packed in bags or barrels for market.

While I have described my invention in detail I do not wish to limit my invention thereto or thereby, as some of the ingredients mentioned may be omitted; other ingredients may be employed; changes may be made in the proportions of the ingredients and changes may also be made in the manner of compounding the ingredients all without departing from the spirit of the invention.

Having now described my invention, what I claim as new and desire to secure by Letters Patent is:—

1. A wall plaster composition consisting of alkali waste, blast furnace slag, calcined dolomite, calcium sulphate, feldspar, vegetable fibre, potassium sulphate and aluminum sulphate.

2. A wall plaster composition comprising—100 parts by weight of alkali waste, 50 parts by weight of blast furnace slag, 25 parts by weight of calcined dolomite, 10 parts by weight of calcium sulphate, 7 parts by weight of feldspar, 3 parts by weight of vegetable fibre, 3 parts by weight of potassium sulphate and 2 parts by weight of aluminum sulphate thoroughly mixed in dry form and ground into a palpable powder.

GEORGE WITTY.